US012451069B2

(12) United States Patent
Han et al.

(10) Patent No.: US 12,451,069 B2
(45) Date of Patent: Oct. 21, 2025

(54) PIXEL CIRCUIT, DRIVING METHOD THEREFOR, AND DISPLAY DEVICE

(71) Applicant: BOE Technology Group Co., Ltd., Beijing (CN)

(72) Inventors: SeungWoo Han, Beijing (CN); Haoliang Zheng, Beijing (CN); Dongni Liu, Beijing (CN); Li Xiao, Beijing (CN); Liang Chen, Beijing (CN); Jiao Zhao, Beijing (CN); Xiaorong Cui, Beijing (CN); Minghua Xuan, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/681,495

(22) PCT Filed: Sep. 24, 2021

(86) PCT No.: PCT/CN2021/120479

§ 371 (c)(1), (2) Date: Feb. 5, 2024

(87) PCT Pub. No.: WO2023/044816

PCT Pub. Date: Mar. 30, 2023

(65) Prior Publication Data

US 2025/0131878 A1 Apr. 24, 2025

(51) Int. Cl.

| | |
|---|---|
| ***G09G 3/3233*** | (2016.01) |
| ***G09G 3/20*** | (2006.01) |
| ***G09G 3/32*** | (2016.01) |

(52) U.S. Cl.

CPC ......... *G09G 3/3233* (2013.01); *G09G 3/2074* (2013.01); *G09G 2300/0852* (2013.01); (Continued)

(58) Field of Classification Search

CPC .......................... G09G 3/3233; G09G 3/3291

See application file for complete search history.

(56) References Cited

U.S. PATENT DOCUMENTS

| | | | | |
|---|---|---|---|---|
| 10,964,254 B2 * | 3/2021 | Hung | ....................... | G09G 3/32 |
| 2016/0266689 A1 | 9/2016 | Yang | | |

(Continued)

FOREIGN PATENT DOCUMENTS

| | | |
|---|---|---|
| CN | 108389549 A | 8/2018 |
| CN | 109859682 A | 6/2019 |

(Continued)

OTHER PUBLICATIONS

PCT/CN2021/120479 international search report dated Jun. 29, 2022.

*Primary Examiner* — Sardis F Azongha

(74) *Attorney, Agent, or Firm* — IPro, PLLC

(57) ABSTRACT

A pixel circuit, a driving method therefor, and a display device. The pixel circuit comprises: a current control circuit (301), a duration control circuit (302), and a light-emitting element (303), wherein the current control circuit (301) is used for receiving a data signal (DI) and a first scan signal (gataA), and controlling the amplitude of a generated drive current according to the data signal (DI) and the first scan signal (gataA), and the duration control circuit (302) is used for receiving a mode control signal (DT), a pulse control signal (hf), a light-emitting control signal (em_b), and the drive current of the current control circuit (301), and controlling, according to the amplitude of the mode control signal (DT), the length of time for providing the light-emitting element (303) with the drive current.

16 Claims, 16 Drawing Sheets

(52) U.S. Cl.
CPC ............... *G09G 2300/0861* (2013.01); *G09G 2320/0233* (2013.01)

(56) References Cited

U.S. PATENT DOCUMENTS

| | | | | |
|---|---|---|---|---|
| 2021/0233461 | A1 | 7/2021 | Yue et al. | |
| 2021/0295774 | A1* | 9/2021 | Sun | G09G 3/3233 |

FOREIGN PATENT DOCUMENTS

| | | | |
|---|---|---|---|
| CN | 111223444 | A | 6/2020 |
| CN | 111710285 | A | 9/2020 |
| CN | 113012634 | A | 6/2021 |

* cited by examiner

--Prior art--

--Prior art--

PIXEL CIRCUIT, DRIVING METHOD THEREFOR, AND DISPLAY DEVICE

CROSS-REFERENCE TO RELATED APPLICATION

This application is a national phase entry under 35 U.S.C § 371 of International Application No. PCT/CN2021/120479, filed on Sep. 24, 2021, the entire content of which is incorporated herein by reference.

TECHNICAL FIELD

The present disclosure relates to the field of display technologies, in particular to a pixel circuit, a driving method therefor, and a display device.

BACKGROUND

With the development of a display technology, people have higher and higher requirements for the display effect of display devices. At present, a brightness adjustment method of an active display device usually uses direct current (DC) dimming. However, when achieving low gray scale brightness, DC dimming has a problem of strobing and eye damage.

SUMMARY

Embodiments of the present application provide a pixel circuit, a driving method therefor, and a display device.

In a first aspect, the embodiments of the present application provide a pixel circuit, including: a current control circuit, a duration control circuit and a light-emitting element; the current control circuit is configured for receiving a data signal and a first scan signal, and controlling an amplitude of a generated drive current according to the data signal and the first scan signal; and the duration control circuit is configured for receiving a mode control signal, a pulse control signal, a light-emitting control signal and the drive current of the current control circuit, and is configured to control a length of time for providing the light-emitting element with the drive current according to the amplitude of the mode control signal.

In some exemplary embodiments, the duration control circuit includes: a duration selection sub-circuit, a first duration control sub-circuit, a second duration control sub-circuit, and a light-emitting control circuit.

The duration selection sub-circuit is connected with a first voltage end, a mode control signal end, a second scan signal end, a third scan signal end, a first node and a second node respectively, and is configured for writing the mode control signal into the first node and the second node under control of the mode control signal, a second scan signal outputted by the second scan signal end and a third scan signal outputted by the third scan signal end.

The first duration control sub-circuit is connected with the first node, a third node and a pulse control signal end respectively, and is configured for writing a pulse control signal of the pulse control signal end into the third node under control of a signal of the first node.

The second duration control sub-circuit is connected with the second node, the third node and a light-emitting control signal end respectively, and is configured for writing, when the mode control signal is in a second mode, a light-emitting control signal of the light-emitting control signal end into the third node under control of a signal of the second node.

And, the light-emitting control circuit is connected with the third node, the first voltage end, the light-emitting control signal end, a first scan signal end, and the current control circuit respectively, and is configured for receiving the drive current, and controlling a duration of the drive current flowing through the light-emitting element under control of a signal of the third node, the light-emitting control signal outputted by the light-emitting control signal end, and the first scan signal outputted by the first scan signal end.

In some exemplary embodiments, the duration selection sub-circuit includes a first duration selection sub-circuit and a second duration selection sub-circuit;

the first duration selection sub-circuit is connected with the first voltage end, the mode control signal end, the second scan signal end, and the first node respectively, and is configured for writing the mode control signal into the first node under the control of the mode control signal and the second scan signal; and the second duration selection sub-circuit is connected with the first voltage end, the mode control signal end, the third scan signal end, and the second node respectively, and is configured for writing the mode control signal into the second node under the control of the mode control signal and the third scan signal.

In some exemplary embodiments, the light-emitting control circuit is connected with the current control circuit, the third node and the first voltage end respectively, and is configured for receiving the drive current, and controlling the duration of the drive current flowing through the light-emitting element under the control of the signal of the third node.

In some exemplary embodiments, the first duration control sub-circuit includes a first transistor; a control electrode of the first transistor is connected with the first node, a first electrode of the first transistor is connected with the pulse control signal end, and a second electrode of the first transistor is connected with the third node.

In some exemplary embodiments, the second duration control sub-circuit includes a second transistor; a control electrode of the second transistor is connected with the second node, a first electrode of the second transistor is connected with the light-emitting control signal end, and a second electrode of the second transistor is connected with the third node.

In some exemplary embodiments, the first duration selection sub-circuit includes a first capacitor and a third transistor;

a control electrode of the third transistor is connected with the second scan signal end, a first electrode of the third transistor is connected with the mode control signal end, and a second electrode of the third transistor is connected with the first node; and a first end of the first capacitor is connected with the first voltage end, and a second end of the first capacitor is connected with the first node.

In some exemplary embodiments, the second duration selection sub-circuit includes a second capacitor and a fourth transistor;

a control electrode of the fourth transistor is connected with the third scan signal end, a first electrode of the fourth transistor is connected with the mode control signal end, and a second electrode of the fourth transistor is connected with the second node; and a first end of the second capacitor is connected with the first voltage end, and a second end of the second capacitor is connected with the second node.

In some exemplary embodiments, the light-emitting control circuit includes a fifth transistor; a control electrode of the fifth transistor is connected with the third node, a first electrode of the fifth transistor is connected with the current control circuit, and a second electrode of the fifth transistor is connected with the first voltage end.

In some exemplary embodiments, the current control circuit includes: a data writing circuit, a storage circuit and a drive circuit; the data writing circuit is configured for writing a data signal outputted by a data signal end into a fourth node under control of the first scan signal; the storage circuit is configured for storing electric energy at the fourth node; and the drive circuit is configured for generating a drive current under control of a signal of the fourth node.

In some exemplary embodiments, the data writing circuit includes an eighth transistor, the storage circuit includes a third capacitor, and the drive circuit includes a drive transistor;

a control electrode of the eighth transistor is connected with a first scan signal end, a first electrode of the eighth transistor is connected with the data signal end, and a second electrode of the eighth transistor is connected with the fourth node; a first end of the third capacitor is connected with the fourth node, and a second end of the third capacitor is connected with a fifth node; and a control electrode of the drive transistor is connected with the fourth node, a first electrode of the drive transistor is connected with the light-emitting element, and a second electrode of the drive transistor is connected with the fifth node.

In some exemplary embodiments, the pixel circuit further includes an external compensation circuit, and the external compensation circuit is configured for compensating a threshold voltage.

In some exemplary embodiments, the external compensation circuit includes a sixth transistor, a seventh transistor and a ninth transistor;

a control electrode of the sixth transistor is connected with the light-emitting control signal end, a first electrode of the sixth transistor is connected with the current control circuit, and a second electrode of the sixth transistor is connected with a first electrode of the seventh transistor; a control electrode of the seventh transistor is connected with the first scan signal end, and a second electrode of the seventh transistor is connected with the first voltage end; and a control electrode of the ninth transistor is connected with a fourth scan signal end, a first electrode of the ninth transistor is connected with the fifth node, and a second electrode of the ninth transistor is connected with the voltage output end.

In a second aspect, an embodiment of the present application further provides a display device, including any above pixel circuit.

In a third aspect, an embodiment of the present application further provides a driving method of a pixel circuit, for driving any above pixel circuit described in the first aspect, the pixel circuit includes a plurality of scanning cycles, and within one scanning cycle, the driving method includes:

receiving a data signal and a first scan signal, and controlling an amplitude of a generated drive current according to the data signal and the first scan signal; and receiving, by a duration control circuit, a mode control signal, a pulse control signal, a light-emitting control signal and the drive current of the current control circuit, and controlling, by the duration control circuit, a length of time for providing a light-emitting element with the drive current according to an amplitude of the mode control signal.

Beneficial effects:

according to the pixel circuit, the driving method therefor, and the display device provided by the embodiments of the present application, by setting the amplitude of the data signal provided by the data signal end, the light-emitting element can work in a current path with a large amplitude, which ensures that the light-emitting element has high uniformity of the emission brightness, high light-emitting efficiency and stable chromaticity coordinates. In a case of achieving high gray scale brightness, the length of time for providing the light-emitting element with the drive current is a second duration, and in a case of achieving low gray scale brightness, the length of time for providing the light-emitting element with the drive current is a first duration. In this way, the drive current with high amplitude can be matched with short light-emitting time to achieve the display of low gray scale brightness, so that the display effect of the display device at low gray scale can be improved.

BRIEF DESCRIPTION OF FIGURES

Drawings are used to provide an understanding of technical solutions of the present application, constitute a part of the specification, and are used to explain the technical solutions of the present application together with embodiments of the present application, which do not constitute a limitation on the technical solutions of the present application.

DETAILED DESCRIPTION

In order to make objectives, technical solutions and advantages of the present application clearer and more understandable, embodiments of the present application will be described in detail below with reference to accompanying drawings. It should be noted that the embodiments in the present application and features in the embodiments may be arbitrarily combined with each other in the case of not conflict.

Unless otherwise defined, technical or scientific terms publicly used in the embodiments of the present application shall have the ordinary meanings understood by those ordinarily skilled in the art to which the present application pertains. Words “first”, “second” and the like used in the embodiments of the present application do not indicate any order, quantity or importance, but are only used to distinguish different components. Words “comprise” or “include” and the like indicate that an element or item appearing before such the word covers listed elements or items appearing after the word and equivalents thereof, and does not exclude other elements or items.

Those skilled in the art may understand that transistors used in all the embodiments of the present application may be thin film transistors or field-effect transistors, or other devices with similar characteristics. Preferably, the thin film transistors used in the embodiments of the present application may be oxide semiconductor transistors. Since sources and drains of the transistors used here are symmetrical, their sources and drains may be interchanged. In the embodiments of the present application, in order to distinguish two electrodes of the transistors except for gates, one of the electrodes is called a first electrode, the other electrode is called a second electrode, the first electrode may be the source, and the second electrode may be the drain.

Figure 1:
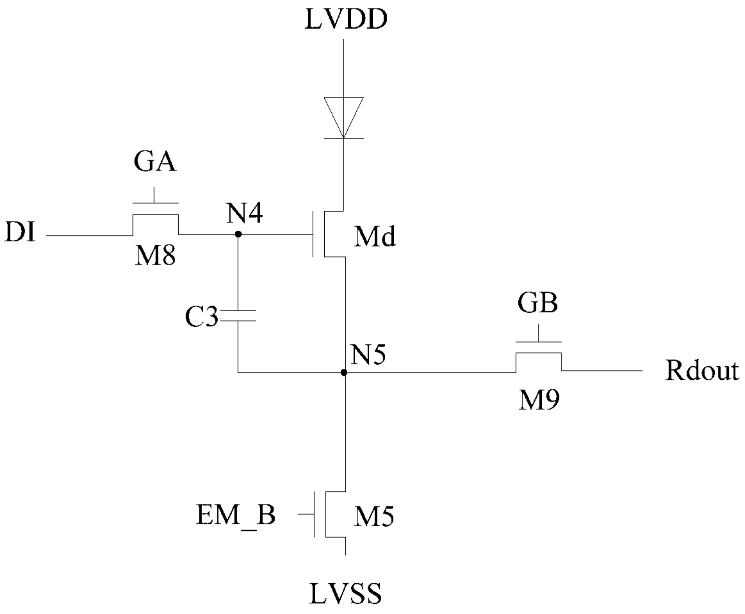
FIG. 1 is a schematic structural diagram of a pixel circuit in the related art provided by an embodiment of the present application.
Figure 2:
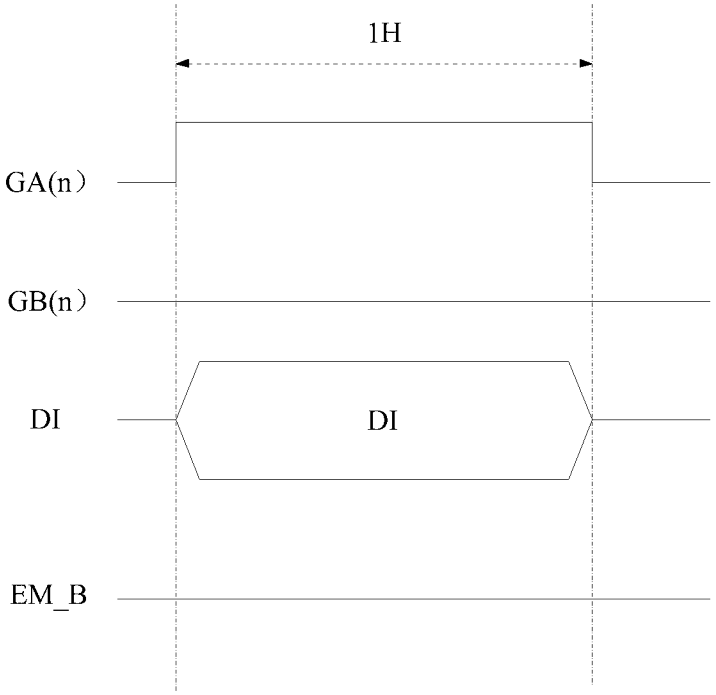
FIG. 2 is a timing diagram of a pixel circuit in the related art provided by an embodiment of the present application.

FIG. 1 shows a schematic structural diagram of a pixel circuit for providing signals to a light emitting diode in the related art, FIG. 2 is a timing diagram of the pixel circuit, and the pixel circuit includes four transistors M5, M8, M9 and Md, and one capacitor C3. The circuit structure mainly relies on a voltage difference between a gate and a source of the transistor Md to provide current signals with different amplitudes to the light emitting diode, and the light emitting diode can present different brightness under control of the current signals with different amplitudes. However, due to the photoelectric characteristic of the light emitting diode itself, for example, a micro inorganic light emitting diode may have problems of chromaticity coordinate drifting, poor brightness uniformity and decreased light-emitting efficiency under current signals with smaller amplitudes, resulting in a fact that the micro inorganic light emitting diode cannot accurately or stably present low gray scale brightness.

The pixel circuit, the driving method therefor, and the display device provided by the present application at least can enable the light emitting diode to accurately present the low gray scale brightness. The pixel circuit, the driving method therefor, and the display device provided by the embodiments of the present application are described in detail below.

Figure 3:
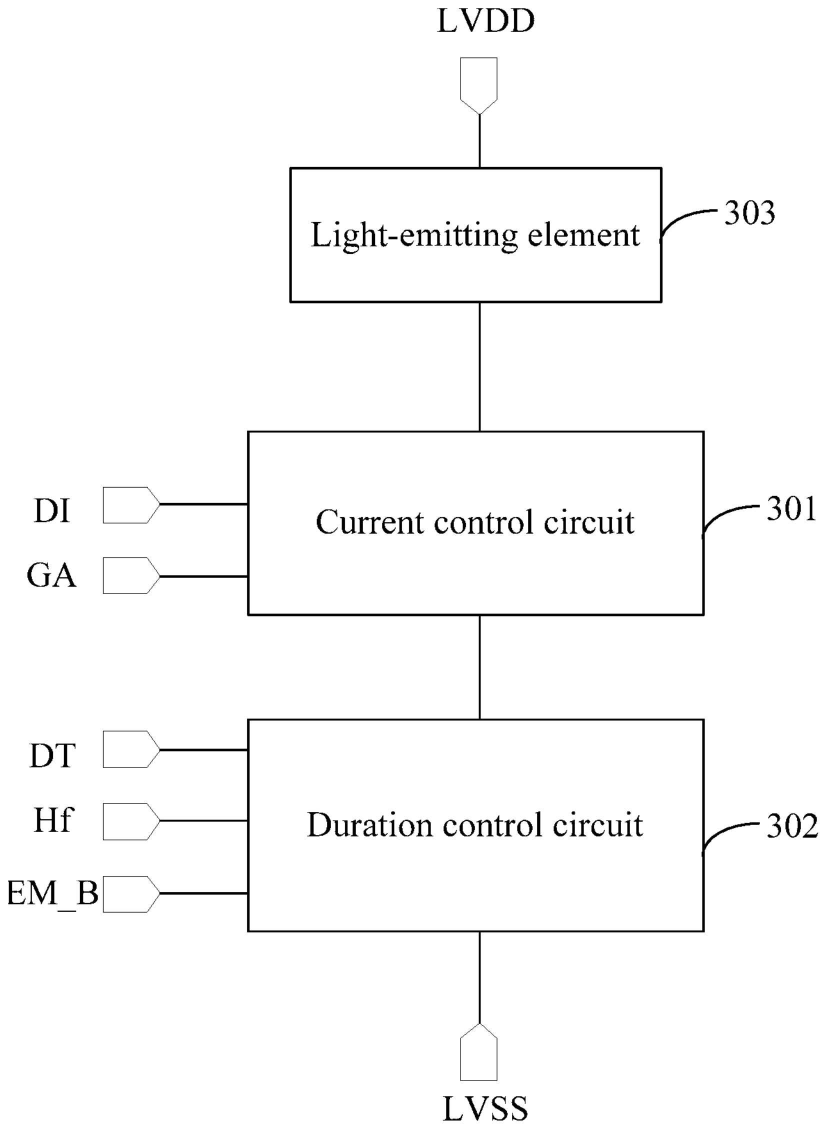
FIG. 3 is a first schematic structural diagram of a pixel circuit provided by an embodiment of the present application.

As shown in FIG. 3, it is a schematic structural diagram of a pixel circuit of an embodiment of the present application, in FIG. 3, the pixel circuit provided by the embodiment of the present application includes: a current control circuit 301, a duration control circuit 302 and a light-emitting element 303.

The current control circuit 301 is connected with a data signal end DI and a first scan signal end GA, and is configured for receiving a data signal DI and a first scan signal gataA, and controlling, under an action of the first scan signal gataA, an amplitude of a drive current according to an amplitude of the data signal DI.

The duration control circuit 302 is connected with a mode control signal end DT, a pulse control signal end Hf, and a light-emitting control signal end EM_B, and is configured for receiving a mode control signal DT, a pulse control signal hf, a light-emitting control signal em_b and a drive current of the current control circuit, and controlling a length of time for providing the light-emitting element 303 with the drive current according to an amplitude of the mode control signal DT.

The pixel circuit provided by the embodiments of the present application may control the length of time for providing the light-emitting element with the drive current within each scanning cycle. For example, the pulse control signal hf provided by the pulse control signal end Hf includes a plurality of valid time periods in a light-emitting stage, and the valid time periods refer to time periods that enable the light-emitting element to be in a current path state. In the light-emitting stage, the valid pulse time periods included by the pulse control signal hf form a first duration, a duration of the light-emitting stage is a second duration, and the first duration is much smaller than the second duration. By setting the amplitude of the data signal DI provided by the data signal end DI, the light-emitting element can work in a current path with a large amplitude, which ensures that the light-emitting element has high uniformity of the emission brightness, high light-emitting efficiency and stable chromaticity coordinates. In a case of achieving high gray scale brightness, the length of time for providing the light-emitting element with the drive current is the second duration, and in a case of achieving low gray scale brightness, the length of time for providing the light-emitting element with the drive current is the first duration. Taking 256 gray scales as an example for illustration, for example, a range of high gray scale brightness is from 80 gray scales to 255 gray scales, then when achieving the 80-255 gray scales, the length of time for providing the light-emitting element with the drive current is the second duration, and the corresponding gray scale brightness is achieved by setting the amplitude of different data signals DI provided by the data signal end DI. For a range of low gray scale of 0-79 gray scales, the length of time for providing the light-emitting element with the drive current is the first duration, and meanwhile, the corresponding gray scale brightness is achieved by setting the amplitude of different data signals DI provided by the data signal end DI. It may be understood that when achieving the high gray scale brightness and the low gray scale brightness, there is overlapping in the amplitude range of the data signal DI provided by the data signal end DI, so as to ensure that the light-emitting element has high uniformity of emission brightness, high light-emitting efficiency and stable chromaticity coordinates.

Figure 4:
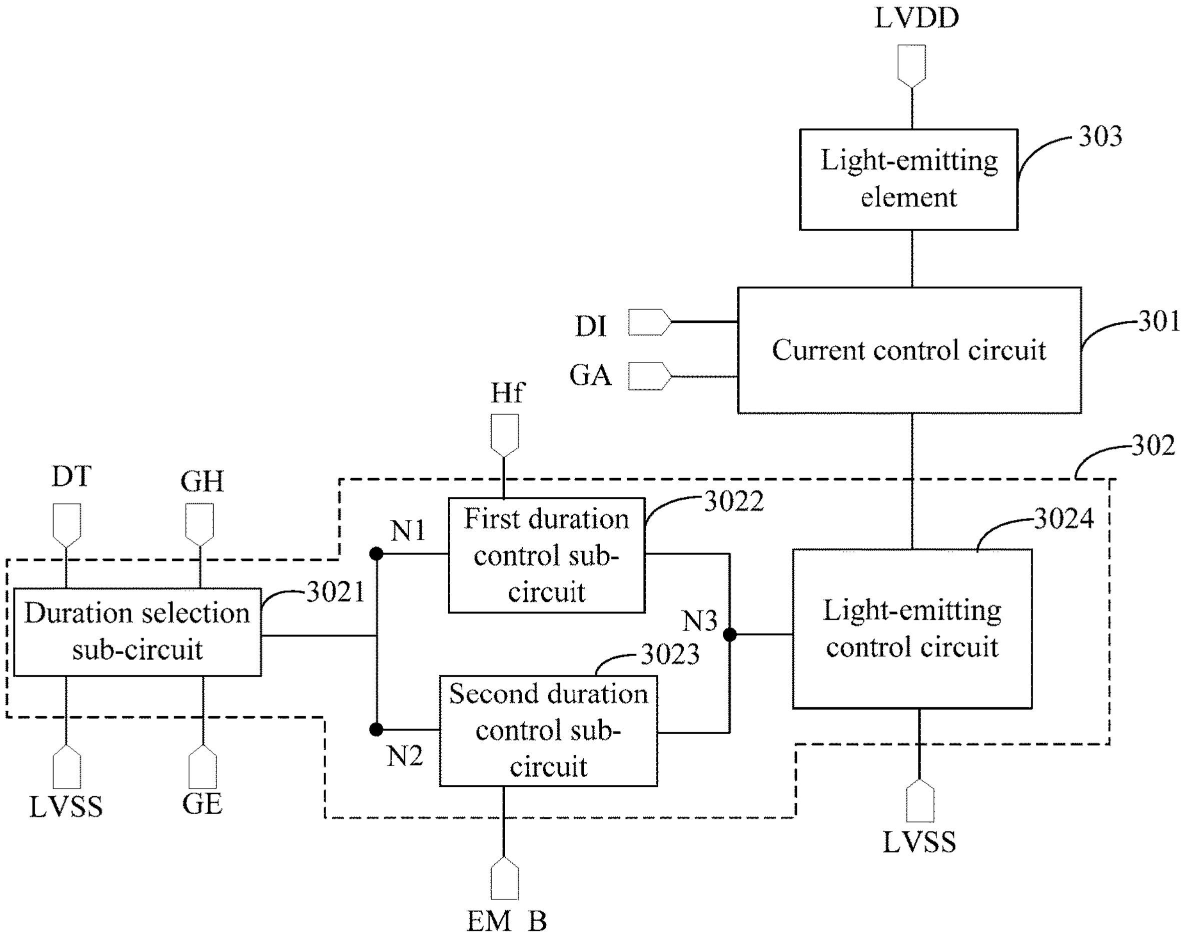
FIG. 4 is a second schematic structural diagram of a pixel circuit provided by an embodiment of the present application.

In some exemplary embodiments, as shown in FIG. 4, the duration control circuit 302 provided by the embodiments of the present application includes: a duration selection sub-circuit 3021, a first duration control sub-circuit 3022, a second duration control sub-circuit 3023 and a light-emitting control circuit 3024.

The duration selection sub-circuit 3021 is connected with a first voltage end LVSS, a mode control signal end DT, a second scan signal end GH, a third scan signal end GE, a first node N1 and a second node N2, and is configured for writing the mode control signal into the first node N1 and the second node N2 under the control of the mode control signal DT, a second scan signal GH outputted by the second scan signal end and a third scan signal GE outputted by the third scan signal end.

The first duration control sub-circuit 3022 is connected with the first node N1, a third node N3 and a pulse control signal end Hf, and is configured for writing a pulse control signal hf of the pulse control signal end Hf into the third node N3 under the control of a signal of the first node N1.

The second duration control sub-circuit 3023 is connected with the second node N2, the third node N3 and a light-emitting control signal end EM_B, and is configured for writing a light-emitting control signal em_b of the light-emitting control signal end EM_B into the third node N3 under control of a signal of the second node N2.

The light-emitting control circuit 3024 is connected with the third node N3, the first voltage end LVSS, the light-emitting control signal end EM_B, the first scan signal end GA and the current control circuit, and is configured for receiving the drive current, and controlling a duration of the drive current flowing through the light-emitting element under the control of a signal of the third node N3, the light-emitting control signal em_b outputted by the light-emitting control signal end EM_B, and the first scan signal gataA outputted by the first scan signal end GA.

Figure 5:
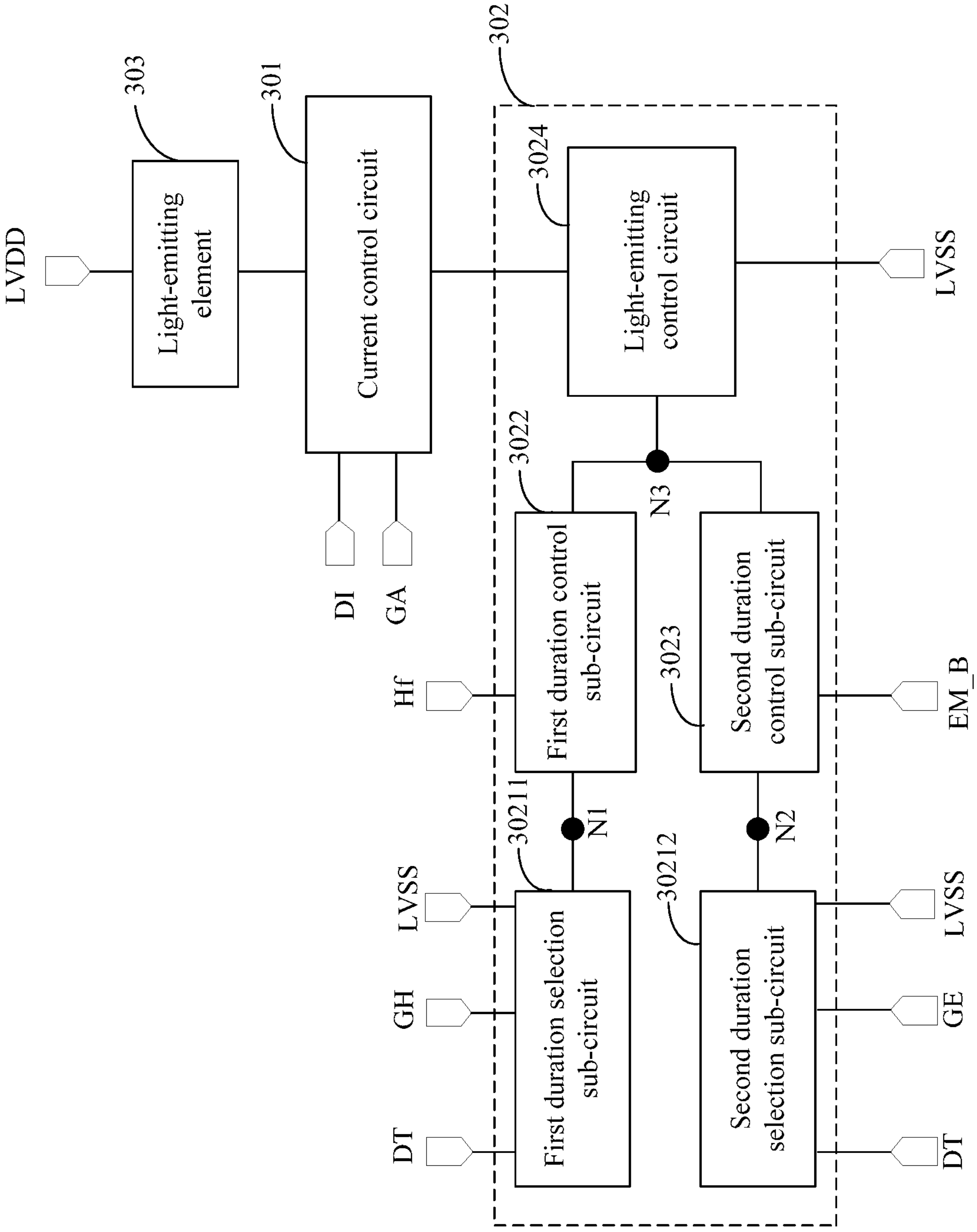
FIG. 5 is a third schematic structural diagram of a pixel circuit provided by an embodiment of the present application.

In some exemplary embodiments, as shown in FIG. 5, the duration selection sub-circuit 3021 includes a first duration selection sub-circuit 30211 and a second duration selection sub-circuit 30212;

- the first duration selection sub-circuit 30211 is connected with the first voltage end LVSS, the mode control signal end DT, the second scan signal end GH, and the first node N1, and is configured for writing the mode control signal DT into the first node N1 under the control of the mode control signal DT and the second scan signal GH; and
- the second duration selection sub-circuit 30212 is connected with the first voltage end LVSS, the mode control signal end DT, the third scan signal end GE, and the second node N2, and is configured for writing the mode control signal DT into the second node N2 under the control of the mode control signal DT and the third scan signal GE.

Figure 8A:
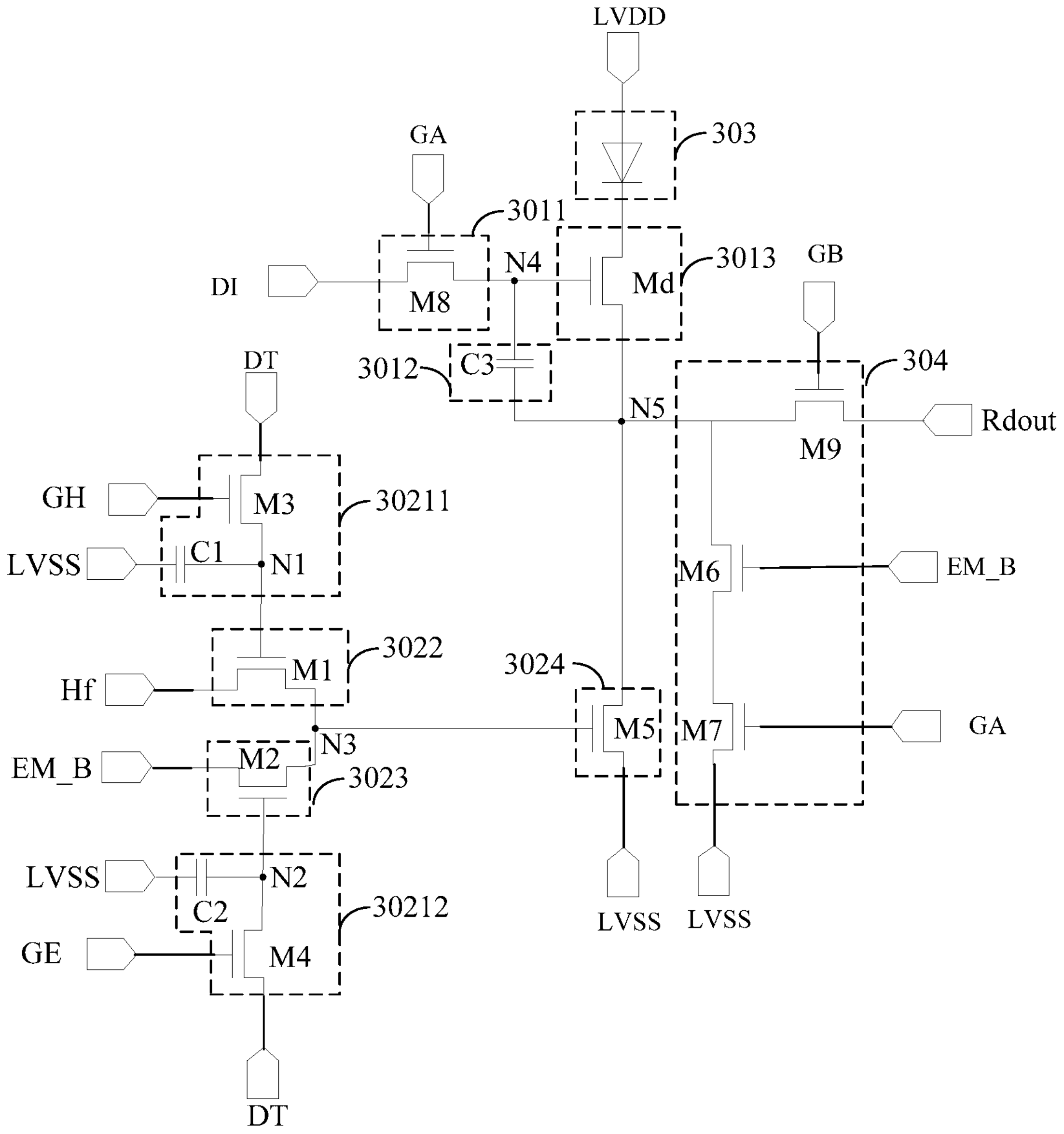
FIG. 8A is a first equivalent circuit diagram of a pixel circuit provided by an embodiment of the present application.

In some exemplary embodiments, as shown in FIG. 8A, the first duration control sub-circuit 3022 includes a first transistor M1, the second duration control sub-circuit 3023 includes a second transistor M2, the first duration selection sub-circuit 30211 includes a first capacitor C1 and a third transistor M3, the second duration selection sub-circuit 30212 includes a second capacitor C2 and a fourth transistor M4, and the light-emitting control circuit 3024 includes a fifth transistor M5.

A control electrode of the first transistor M1 is connected with the first node N1, a first electrode of the first transistor M1 is connected with the pulse control signal end, and a second electrode of the first transistor M1 is connected with the third node N3; a control electrode of the second transistor M2 is connected with the second node N2, a first electrode of the second transistor M2 is connected with the light-emitting control signal end, and a second electrode of the second transistor M2 is connected with the third node N3; a control electrode of the third transistor M3 is connected with the second scan signal end, a first electrode of the third transistor M3 is connected with the mode control signal end, and a second electrode of the third transistor M3 is connected with the first node N1; a first end of the first capacitor C1 is connected with the first voltage end, and a second end of the first capacitor C1 is connected with the first node N1; a control electrode of the fourth transistor M4 is connected with the third scan signal end, a first electrode of the fourth transistor M4 is connected with the mode control signal end, and a second electrode of the fourth transistor M4 is connected with the second node N2; a first end of the second capacitor C2 is connected with the first voltage end, and a second end of the second capacitor C2 is connected with the second node N2; and a control electrode of the fifth transistor is connected with the third node N3, a first electrode of the fifth transistor M5 is connected with the current control circuit, and a second electrode of the fifth transistor M5 is connected with the first voltage end.

Figure 6:
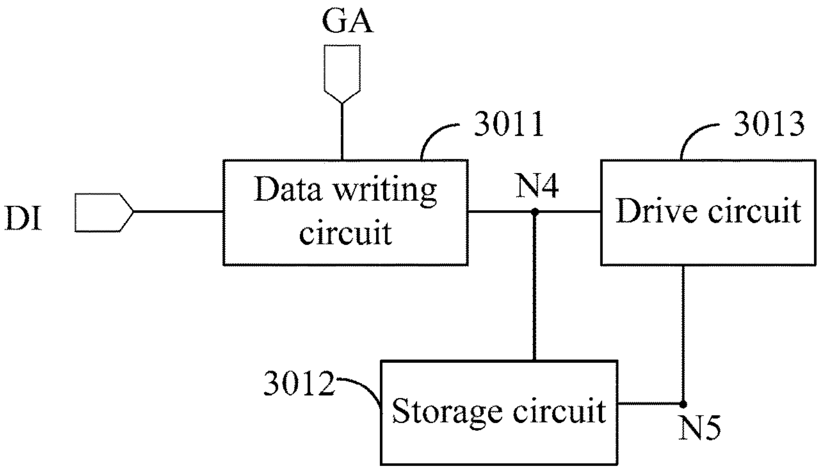
FIG. 6 is a schematic structural diagram of a data writing circuit provided by an embodiment of the present application.

In some exemplary embodiments, as shown in FIG. 6, the current control circuit 301 may include: a data writing circuit 3011, a storage circuit 3012 and a drive circuit 3013;

- the data writing circuit 3011 is configured for writing a data signal DI outputted by the data signal end DI into a fourth node N4 under the control of the first scan signal gataA;
- the storage circuit 3012 is configured for storing electric energy at the fourth node N4; and
- the drive circuit 3013 is configured for generating a drive current under the control of a signal of the fourth node N4.

As shown in FIG. 8A, the data writing circuit 3011 may include an eighth transistor M8, the storage circuit 3012 may include a third capacitor C3, and the drive circuit 3013 may include a drive transistor Md. Specifically, a control electrode of the eighth transistor M8 is connected with the first scan signal end, a first electrode of the eighth transistor M8 is connected with the data signal end, and a second electrode of the eighth transistor M8 is connected with the fourth node N4; a first end of the third capacitor C3 is connected with the fourth node N4, and a second end of the third capacitor C3 is connected with a fifth node N5; and a control electrode of the drive transistor Md is connected with the fourth node N4, a first electrode of the drive transistor Md is connected with the light-emitting element, and a second electrode of the drive transistor Md is connected with the fifth node N5.

Figure 7:
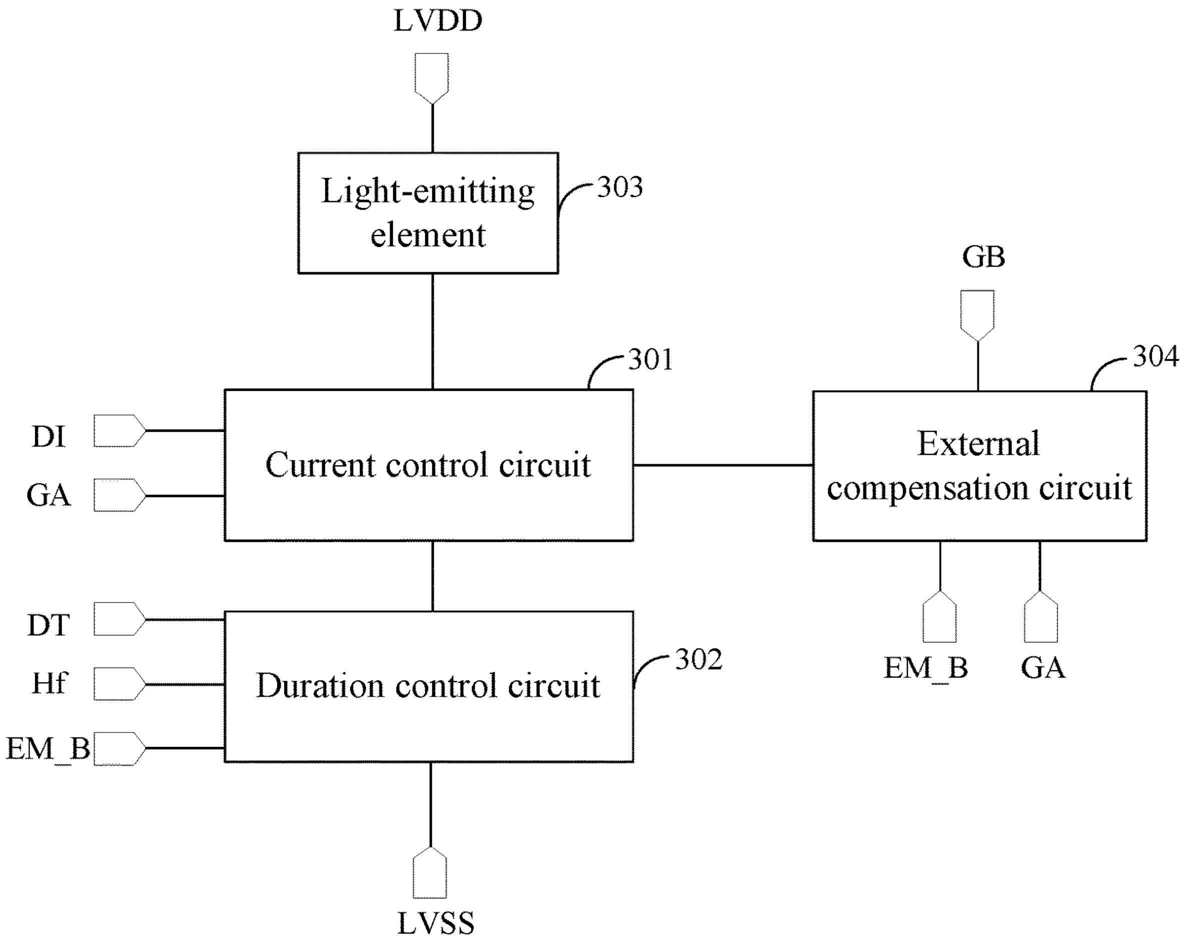
FIG. 7 is a fifth schematic structural diagram of a pixel circuit provided by an embodiment of the present application.

In some exemplary embodiments, as shown in FIG. 7, the pixel circuit provided by the embodiments of the present application may further include an external compensation circuit 304, and the external compensation circuit 304 is configured for compensating a threshold voltage.

As shown in FIG. 8A, the external compensation circuit 304 may include a sixth transistor M6, a seventh transistor M7 and a ninth transistor M9. A control electrode of the sixth transistor M6 is connected with the light-emitting control signal end, a first electrode of the sixth transistor M6 is connected with the current control circuit, and a second electrode of the sixth transistor M6 is connected with a first electrode of the seventh transistor M7; a control electrode of the seventh transistor M7 is connected with the first scan signal end, and a second electrode of the seventh transistor M7 is connected with the first voltage end; and a control electrode of the ninth transistor M9 is connected with a fourth scan signal end, a first electrode of the ninth transistor M9 is connected with the fifth node N5, and a second electrode of the ninth transistor M9 is connected with a threshold voltage output end Rdout.

FIG. 8A shows exemplary structures of the data writing circuit 3011, the storage circuit 3012, the drive circuit 3013, the external compensation circuit 304, the first duration control sub-circuit 3022, the second duration control sub-circuit 3023, the first duration selection sub-circuit 30211, the second duration selection sub-circuit 30212 and the light-emitting control circuit 3024. It is easy for those skilled in the art to understand that implementation methods of all above circuits are not limited to this, as long as their respective functions can be achieved.

Figure 8B:
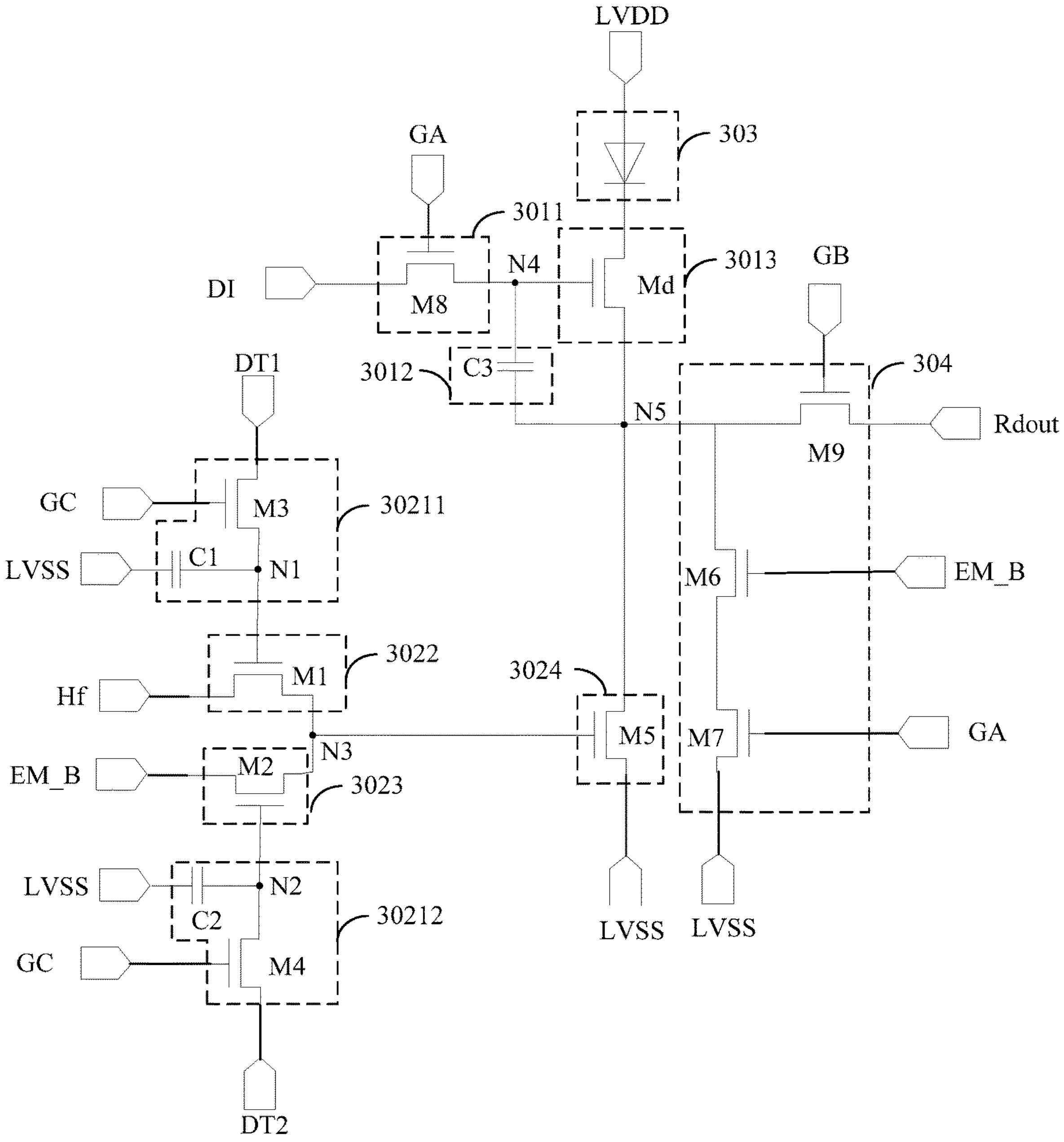
FIG. 8B is a second equivalent circuit diagram of a pixel circuit provided by an embodiment of the present application.

In some exemplary embodiments, as shown in FIG. 8B, a control electrode of a third transistor M3 in the first duration selection sub-circuit 30211 and a control electrode of a fourth transistor M4 in the second duration selection sub-circuit 30212 may be connected with the same scan signal end GC, the scan signal end GC is a signal end different from the first scan signal end GA or the fourth scan signal end GB, and an active level time of the scan signal end GC is earlier than an active time of the first scan signal end GA. In this case, a first electrode of the third transistor M3 in the first duration selection sub-circuit 30211 and a first electrode of the fourth transistor M4 in the second duration selection sub-circuit 30212 need to be connected with different data signal ends, that is, the first electrode of the third transistor M3 in the first duration selection sub-circuit 30211 is connected with a first mode control signal end DT1, and the first electrode of the fourth transistor M4 in the second duration selection sub-circuit 30212 is connected with a second mode control signal end DT2. Therefore, within the active time of the scan signal end GC, corresponding mode control signals may be written into the first duration selection sub-circuit 30211 and the second duration selection sub-circuit 30212 simultaneously.

In some exemplary embodiments, the light-emitting element may be a mini light emitting diode (Mini LED), a micro light emitting diode (Micro LED), or other types of light emitting diodes, such as an organic light emitting diode (OLED), and a quantum dot light emitting diode (QLED). In practical applications, the structure of the light-emitting element 303 needs to be designed and determined according to the practical application environment, which is not limited here. The light-emitting element 303 being the micro light emitting diode is taken as an example for illustration below.

In some exemplary embodiments, the first transistor M1 to the ninth transistor M9, and the drive transistor Md may be N-type transistors or P-type transistors, and the embodiments of the present application takes the N-type transistor as an example for illustration.

In some exemplary embodiments, all transistors in the embodiments of the present application may be the N-type transistors, and specifically, active layer materials of the transistors may be low-temperature poly-silicon or metal oxides.

In some exemplary embodiments, a pulse control signal Hf outputted by a pulse control signal end Hf may be generated by an external integrated circuit (IC).

Figure 9:
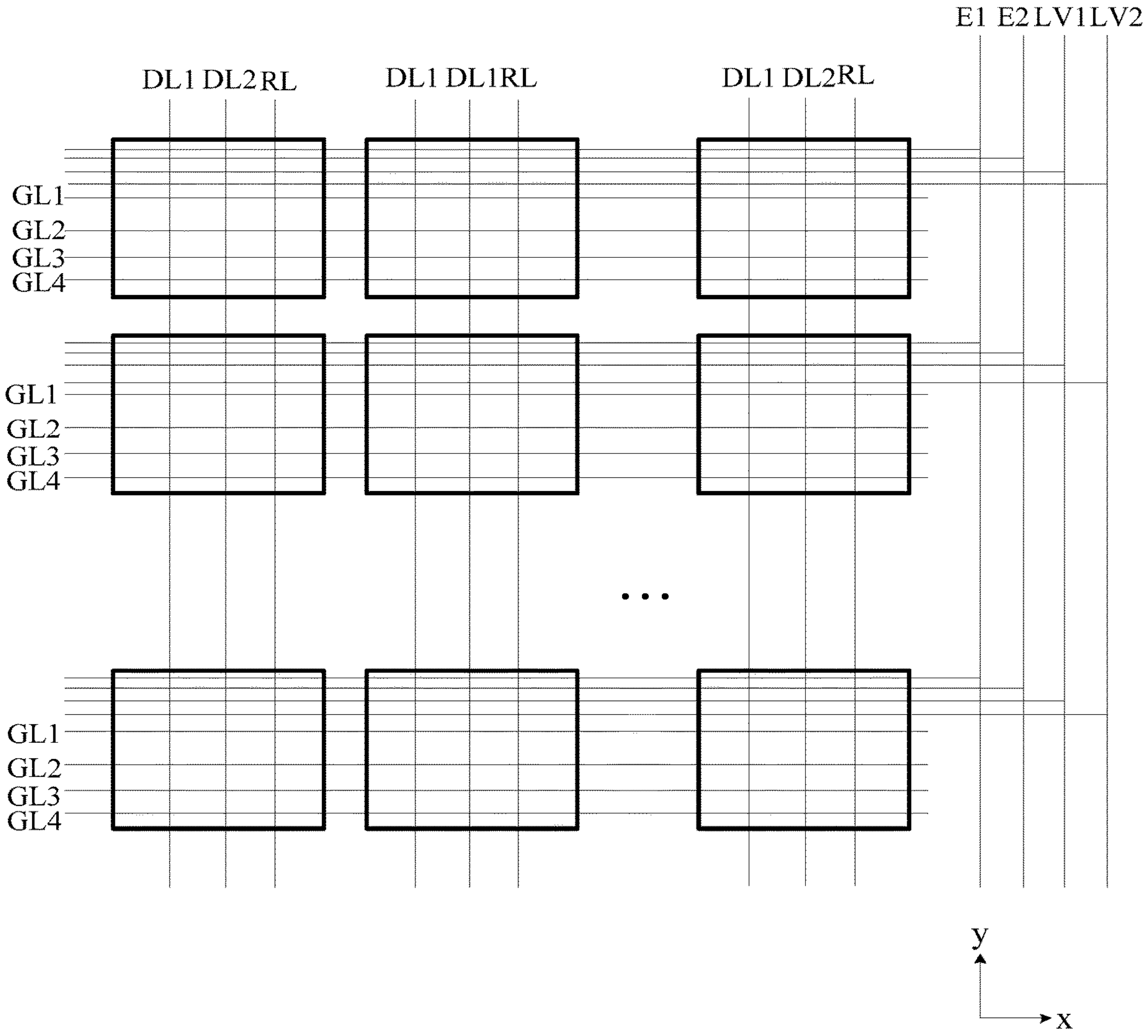
FIG. 9 is a schematic wiring diagram of a pixel circuit provided by an embodiment of the present application.

In some exemplary embodiments, as shown in FIG. 9, when a plurality of pixel circuits are arranged in an array, it includes a plurality of first scan signal lines GL1, a plurality of second scan signal lines GL2, a plurality of third scan signal lines GL3, a plurality of fourth scan signal lines GL4, a plurality of first data signal lines DL1, a plurality of second data signal lines DL2, a plurality of compensation voltage control lines RL and a light-emitting control signal line E1, a pulse control signal line E2, a first voltage line LV1, and a second voltage line LV2.

It may be understood that the first scan signal end GA, the second scan signal end GH, the third scan signal end GE and the fourth scan signal end GB of each pixel circuit corresponding to a row of sub-pixels are coupled to a same first scan signal lines GL1, a same second scan signal lines GL2, a same third scan signal lines GL3 and a same fourth scan signal lines GL4, respectively; the mode control signal end DT, the data signal end DI and the threshold voltage output end Rdout of each pixel circuit corresponding to a column of sub-pixels are coupled to a same first data signal lines DL1, a same second data signal lines DL2 and a same compensation voltage control lines RL, respectively; and the light-emitting control signal line E1, the pulse control signal line E2, the first voltage line LV1 and the second voltage line LV2 are shared signal lines, which are respectively coupled to the light-emitting control signal ends EM_B, the pulse control signal ends Hf, the first voltage ends LVSS and the second voltage ends LVDD of all the pixel circuits.

Figure 10:
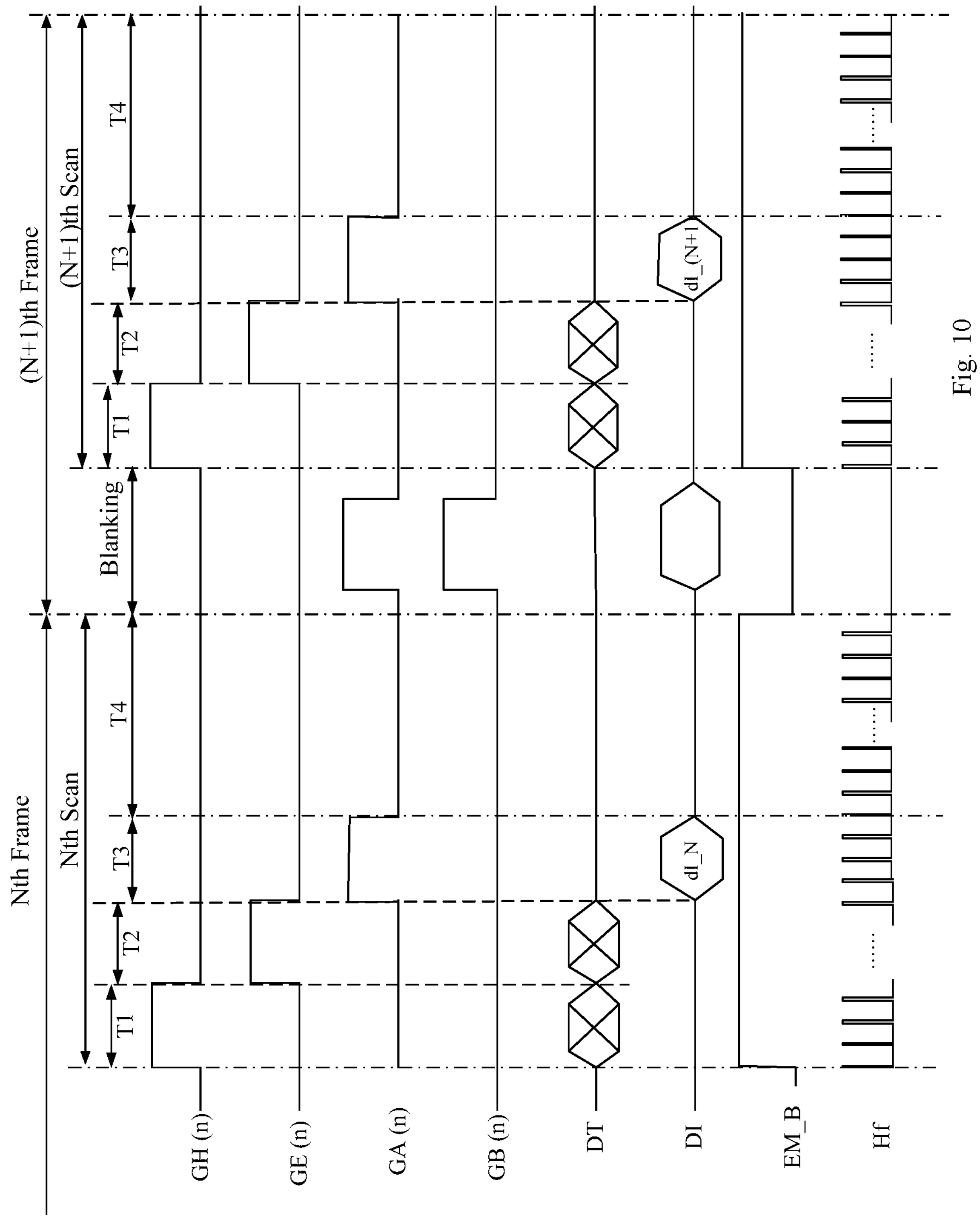
FIG. 10 is a timing diagram of a pixel circuit provided by an embodiment of the present application.

FIG. 10 is a work timing diagram of the pixel circuit shown in FIG. 8A, and the technical solution of the embodiments of the present application is further described below through a working process of the pixel circuit. As shown in FIG. 9, a first voltage end LVSS provides a low level signal lvss continuously, and a second voltage end LVDD provides a high level signal lvdd continuously. The working process of the pixel circuit within each scanning cycle includes following stages.

Figure 11:
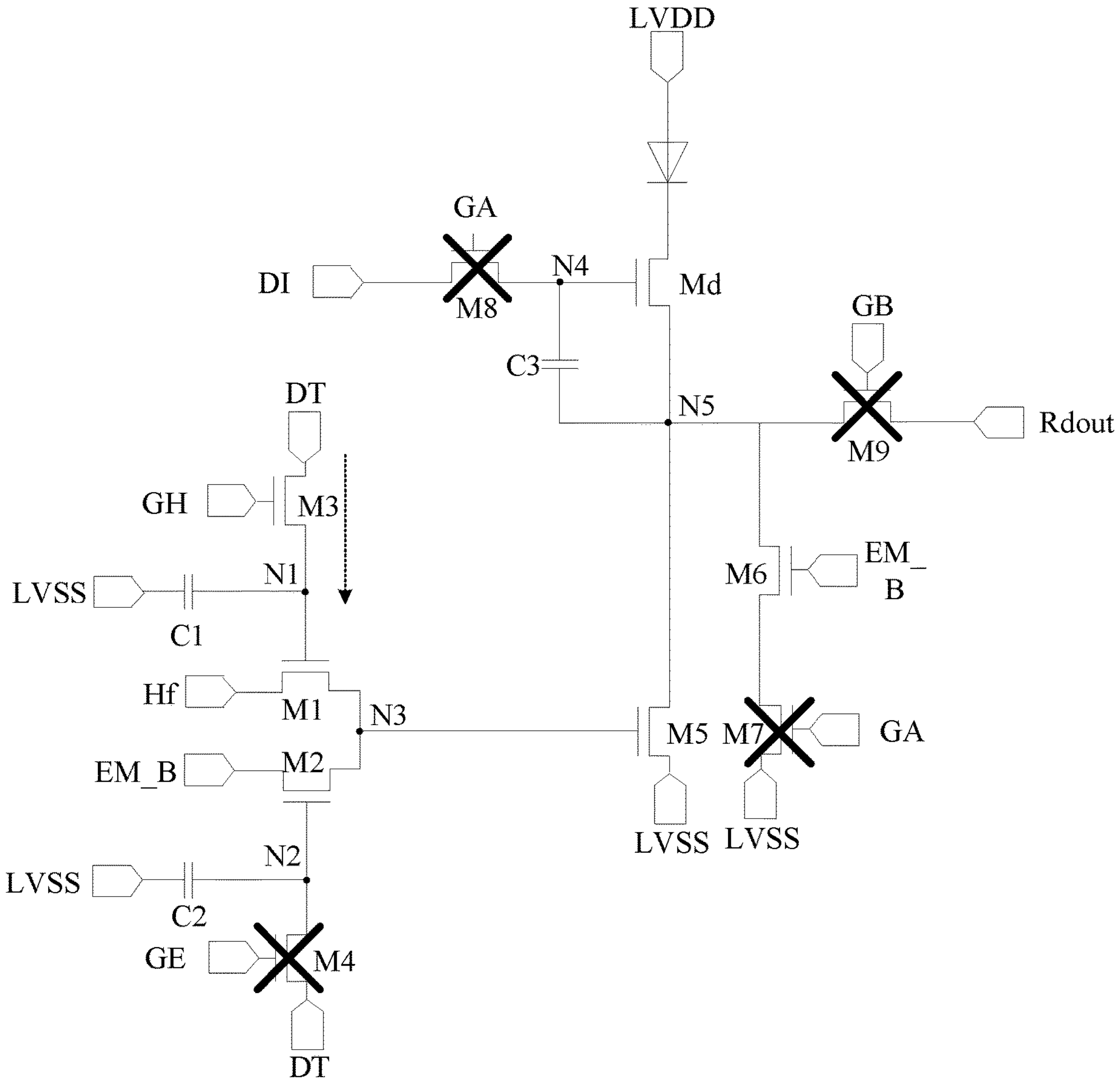
FIG. 11 is a schematic working diagram of a pixel circuit in a stage T1 provided by an embodiment of the present application.

In the first stage T1, as shown in FIG. 11, a second scan signal GH outputted by a second scan signal end GH is a high level signal, a third transistor M3 is turned on to write a mode control signal DT into a first node N1, and a first capacitor C1 is charged.

Figure 12:
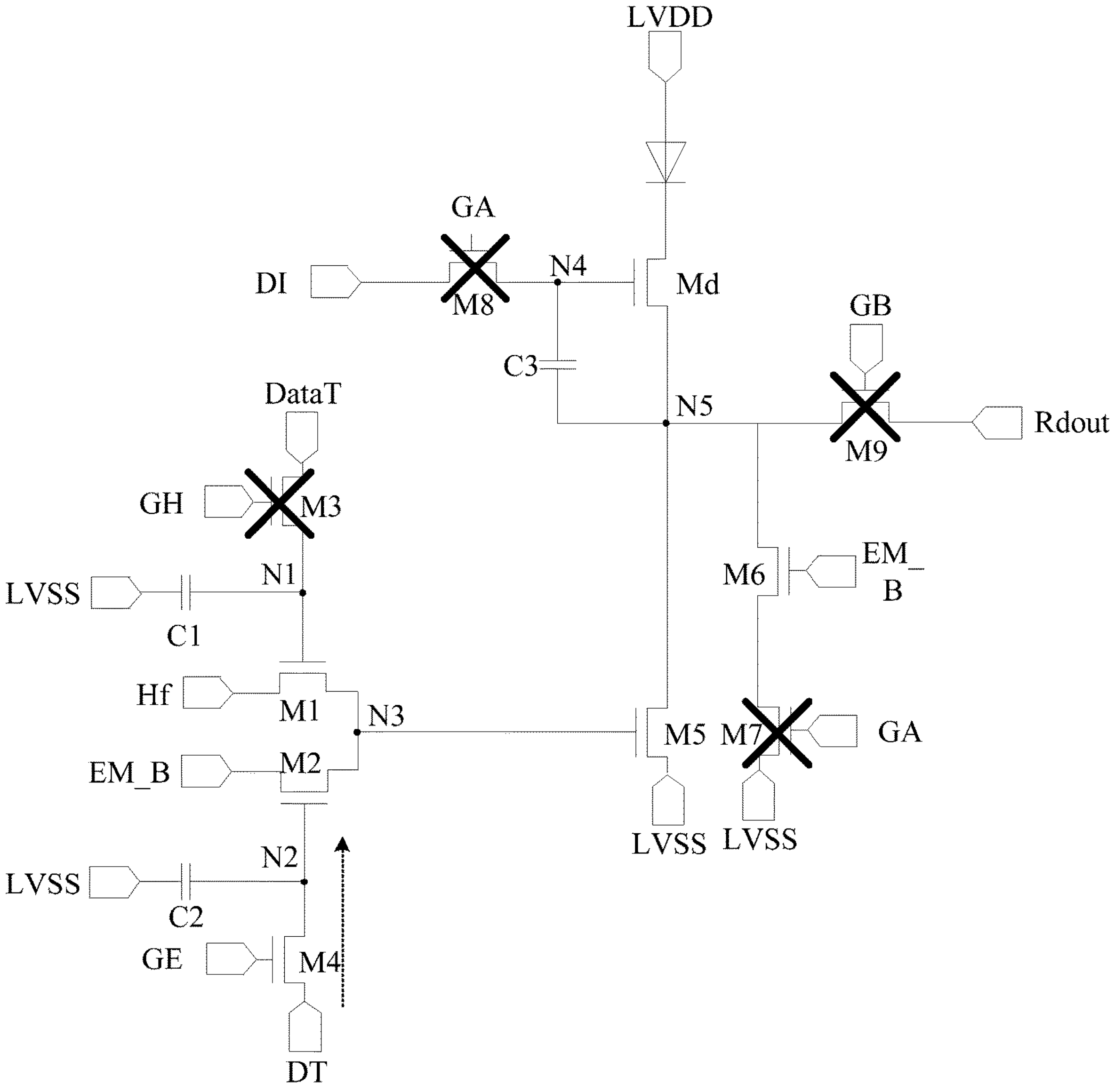
FIG. 12 is a schematic working diagram of a pixel circuit in a stage T2 provided by an embodiment of the present application.

In the second stage T2, as shown in FIG. 12, a third scan signal GE outputted by a third scan signal end GE is a high level signal, a fourth transistor M4 is conducted to write the mode control signal DT into a second node N2, and a second capacitor C2 is charged.

In the third stage T3, the second scan signal GH outputted by the second scan signal end GH is a low level signal, the third scan signal GE outputted by the third scan signal end GE is a low level signal, a first scan signal gataA outputted by a first scan signal end GA is a high level signal, an eighth transistor M8 is turned on, and a data signal DI provided by a data signal end DI is written and stored into a fourth node N4, namely a gate of a drive transistor Md.

Figure 13:
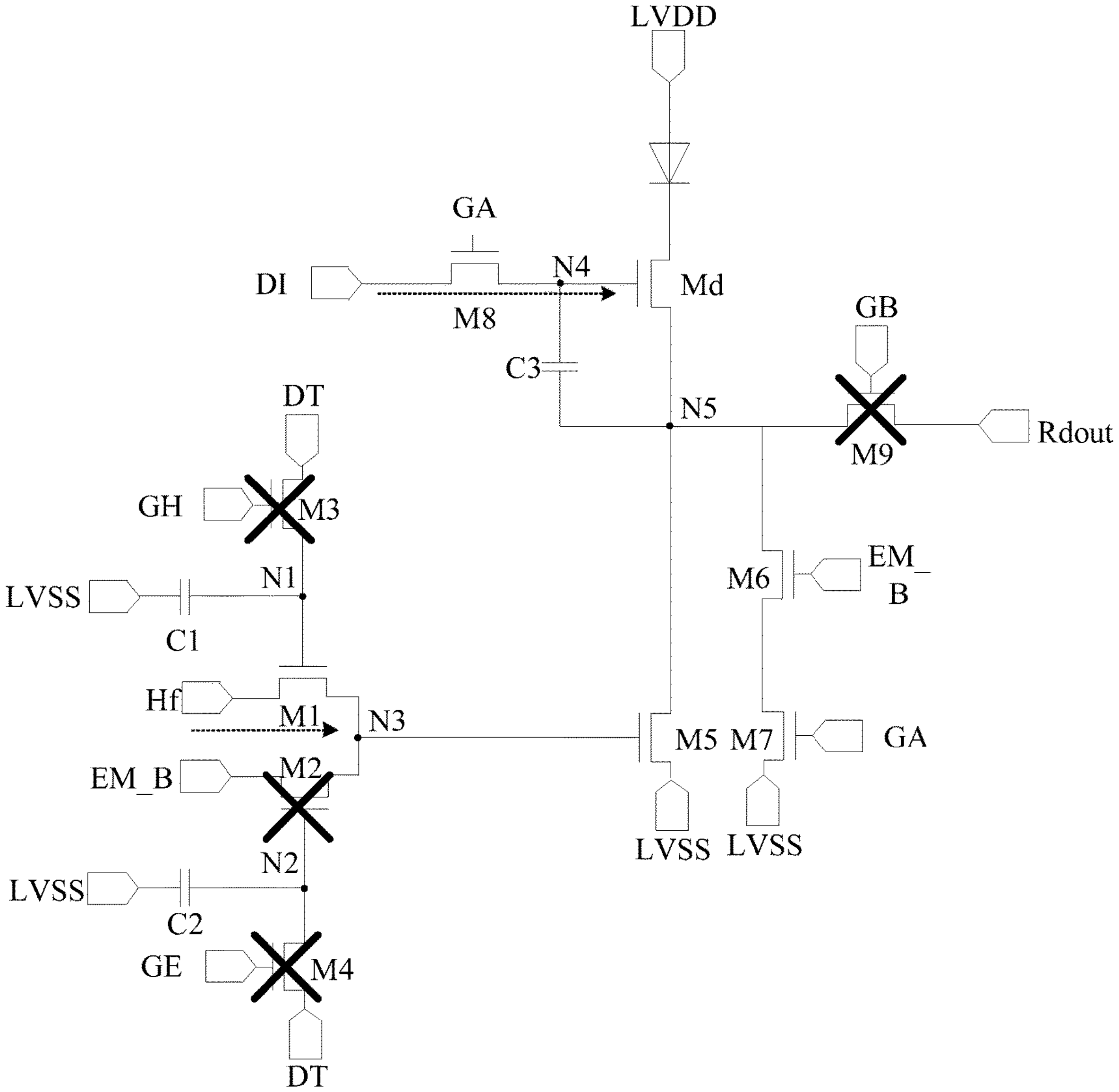
FIG. 13 is a first schematic working diagram of a pixel circuit in a stage T3 provided by an embodiment of the present application.
Figure 14:
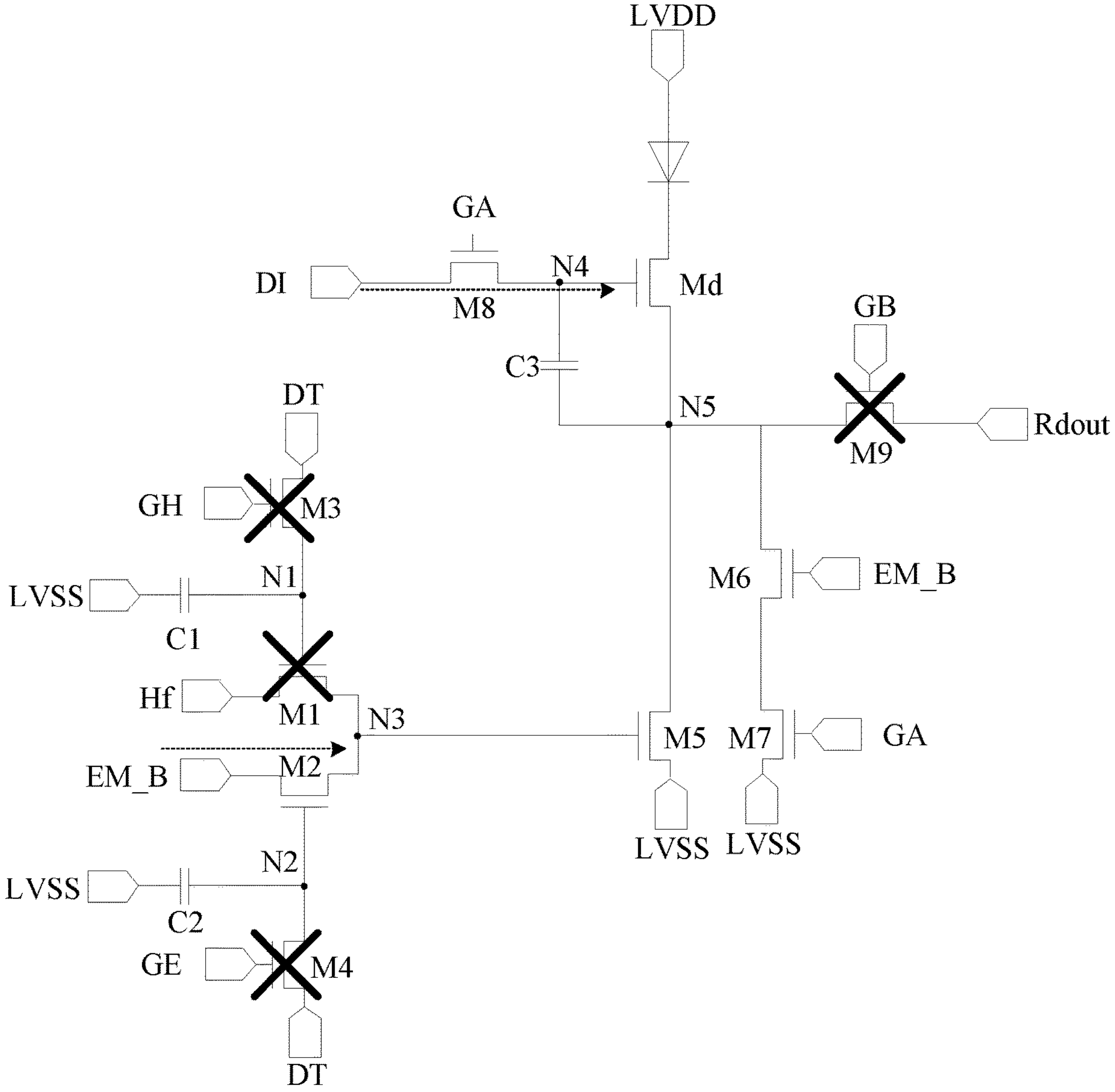
FIG. 14 is a second schematic working diagram of a pixel circuit in a stage T3 provided by an embodiment of the present application.

In the fourth stage T4, namely a light-emitting stage, the first scan signal gataA outputted by the first scan signal end GA is changed into a low level signal, a seventh transistor M7 and the eighth transistor M8 are turned off, and a fifth transistor M5 controls a length of time for providing the light-emitting element with the drive current according to a potential of a third node N3. In some embodiments, as shown in FIG. 13, if the mode control signal DT in the stage T1 is a high level signal DTH, and the mode control signal DT in the stage T2 is a low level signal DTL, at this time, the first capacitor C1 is at a high level, the second capacitor C2 is at a low level, the second transistor M2 is turned off, the first transistor M1 is turned on, a pulse control signal hf outputted by a pulse control signal end Hf passes through the first transistor M1 and is written into the third node N3, namely the control electrode of the fifth transistor M5, and then in the light-emitting stage, the light-emitting element achieves high gray scale brightness. In some other embodiments, as shown in FIG. 14, the mode control signal DT in the stage T1 is a low level signal DTL, and the mode control signal DT in the stage T2 is a high level signal DTH, at this time, the first capacitor C1 is at a low level, the second capacitor C2 is at a high level, the second transistor M2 is turned on, the first transistor M1 is turned off, a light-emitting control signal em_b outputted by the light-emitting control signal end EM_B passes through the second transistor M2 and is written into the third node N3, namely the control electrode of the fifth transistor M5, and then in the light-emitting stage, the light-emitting element achieves high gray scale brightness.

Exemplarily, the pulse control signal hf in the embodiments of the present application is a high-frequency pulse signal, for example, a frequency of the pulse control signal hf may be taken values from 3000 Hz-60000 Hz, such as 3000 Hz or 60000 Hz; and a frequency of the light-emitting control signal em_b may be taken values from 60 Hz-120 Hz, such as 60 Hz or 120 Hz.

Based on the above steps, by setting the amplitude of the data signal DI provided by the data signal end DI, the light-emitting element can work in a current path with a large amplitude, which ensures that the light-emitting element has high uniformity of the emission brightness, high light-emitting efficiency and stable chromaticity coordinates. In the case of achieving the high gray scale brightness, the length of time for providing the light-emitting element with the drive current is a second duration; and in the case of achieving the low gray scale brightness, the length of time for providing the light-emitting element with the drive current is a first duration. In this way, the drive current with high amplitude can be matched with short light-emitting time to achieve the display of low gray scale brightness, so that the display effect of the display device at low gray scale can be improved.

Figure 15:
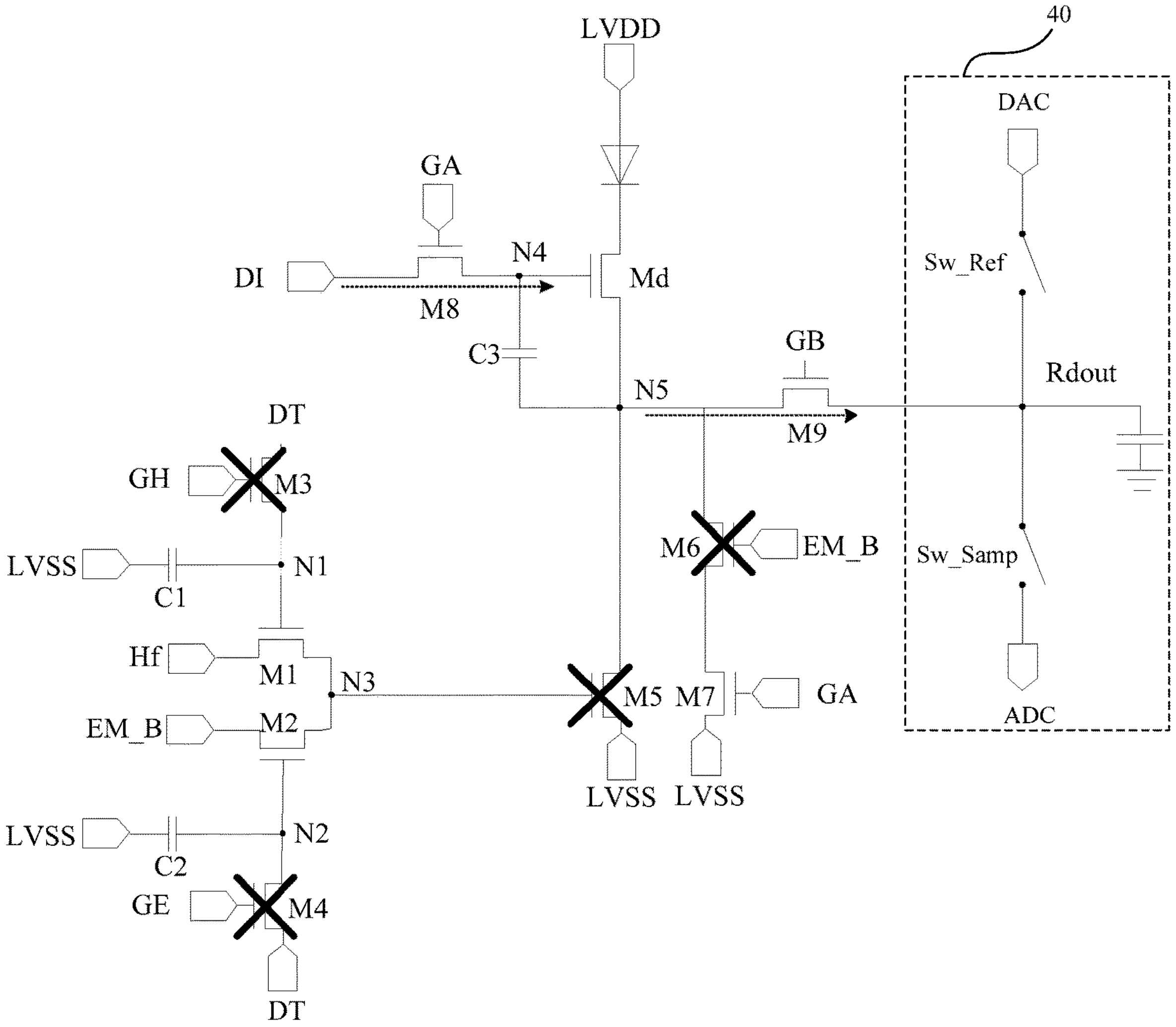
FIG. 15 is a schematic working diagram of a pixel circuit in a compensation stage provided by an embodiment of the present application.
Figure 16:
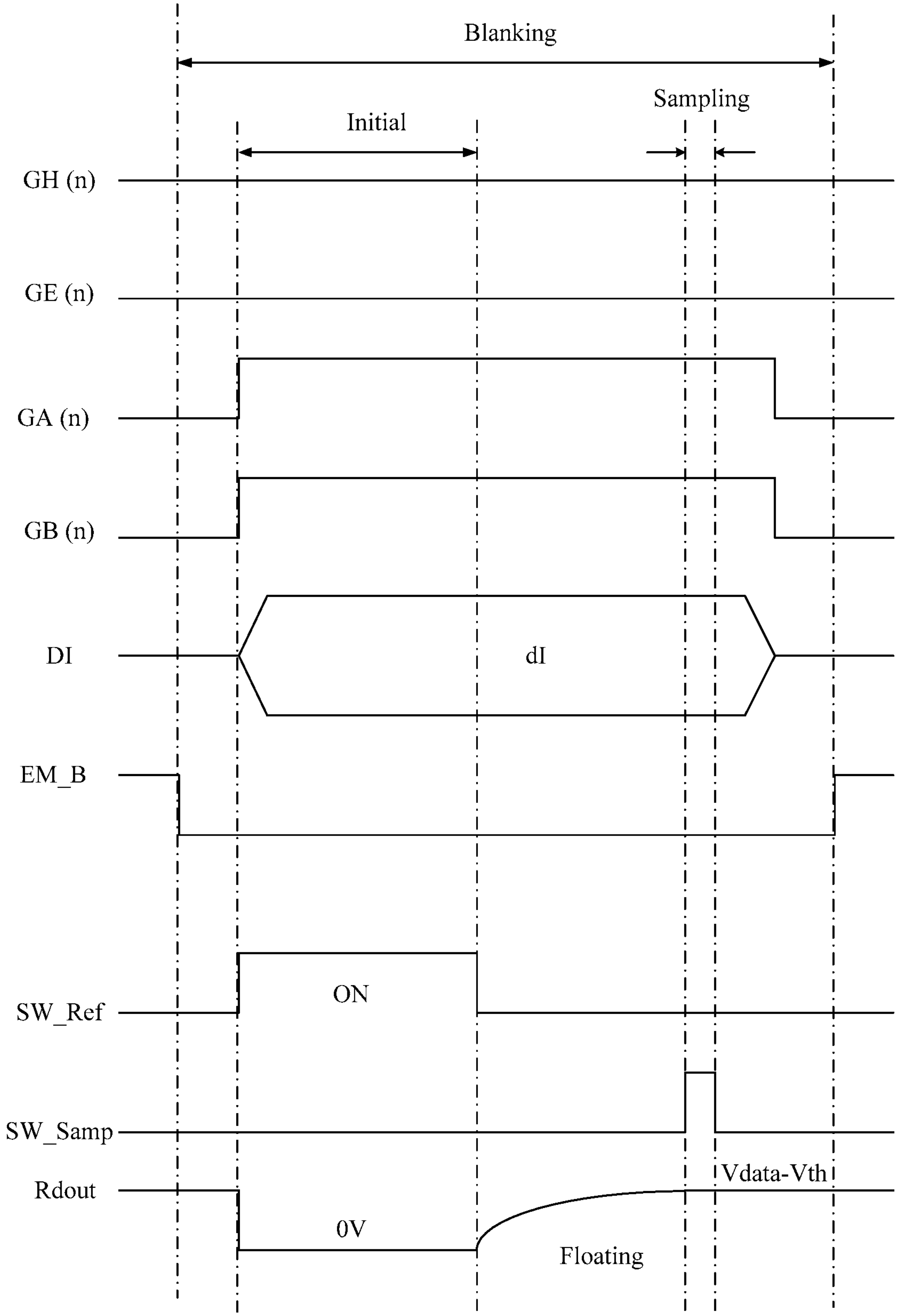
FIG. 16 is a timing diagram of a pixel circuit in a compensation stage provided by an embodiment of the present application.

In some embodiments, the pixel circuit provided by the embodiments of the present application may further include a threshold voltage Vth reading stage in addition to the above stage T1, stage T2, stage T3 and stage T4 during working. For example, as shown in FIG. 15, a threshold voltage output end Rdout may be connected with a reading circuit 40 to sample a threshold voltage Vth of the drive transistor Md. Specifically, a work timing diagram of the reading circuit 40 is as shown in FIG. 16, the reading circuit 40 works within a Blanking time between two adjacent scanning cycles, the Blanking time is a time period in which the light-emitting control signal em_b outputted by the light-emitting control signal end EM_B is in a low level, it may be understood that one Blanking time and one scanning cycle form one frame, and the Blanking time includes following stages.

In an initial stage (Initial), a first scan signal gataA provided by the first scan signal end GA and a fourth scan signal GB provided by the fourth scan signal end GB are both high level signals, the eighth transistor M8 and a ninth transistor M9 are turned on, a switch Sw_ref is closed, and the node N5 and the threshold voltage output end Rdout are set to be 0 V by an external power supply, so as to achieve potential initialization.

In a threshold voltage output stage, the first scan signal gataA provided by the first scan signal end GA and the fourth scan signal GB provided by the fourth scan signal end GB are high level signals, while a light-emitting control signal em_b provided by a light-emitting control signal end EM_B and a pulse control signal hf provided by a pulse control signal end are both low level signals, the eighth transistor M8 and the ninth transistor M9 are turned on, the switch Sw_ref is disconnected, a fifth transistor M5 and a sixth transistor M6 are turned off, a second electrode (namely the fifth node N5) of the drive transistor Md is charged to (Vdata-Vth), and a potential of the fifth node N5 is transmitted to the threshold voltage output end Rdout through the ninth transistor M9.

In a threshold voltage reading sampling stage (Sampling), Sw_samp is closed to transmit the potential (Vdata-Vth) stored at the threshold voltage output end Rdout to an external chip, and Vth is extracted. Therefore, at the third stage T3 in the scanning cycle after the Blanking time, Vth may be compensated into a data signal DI provided by a data signal end DI, so that the amplitude of the drive current is unrelated to the threshold voltage Vth of the drive transistor Md, that is, the threshold voltage Vth of the drive transistor Md is prevented from affecting the amplitude of the drive current provided to the light-emitting element.

It may be understood that within the Blanking time, the pulse control signal end Hf provides a low level signal, so as to ensure the accurate reading of the threshold voltage Vth of the drive transistor Md.

In some embodiments, the pixel circuit may further adopt an internal compensation mode to eliminate the effect of the threshold voltage Vth of the drive transistor Md on the amplitude of the drive current. For example, before the third stage T3 in the scanning cycle, the drive transistor Md may be charged to a saturation region, which is not limited here.

The embodiments of the present application further provide a display device, the display device includes a plurality of sub-pixels arranged in an array, and each sub-pixel includes the pixel circuit described in any of the above embodiments. The display device of the embodiments of the present disclosure may be any product or component with a display function, such as a mobile phone, a tablet, a television, a display, a laptop, a digital photo frame and a navigator.

Figure 17:
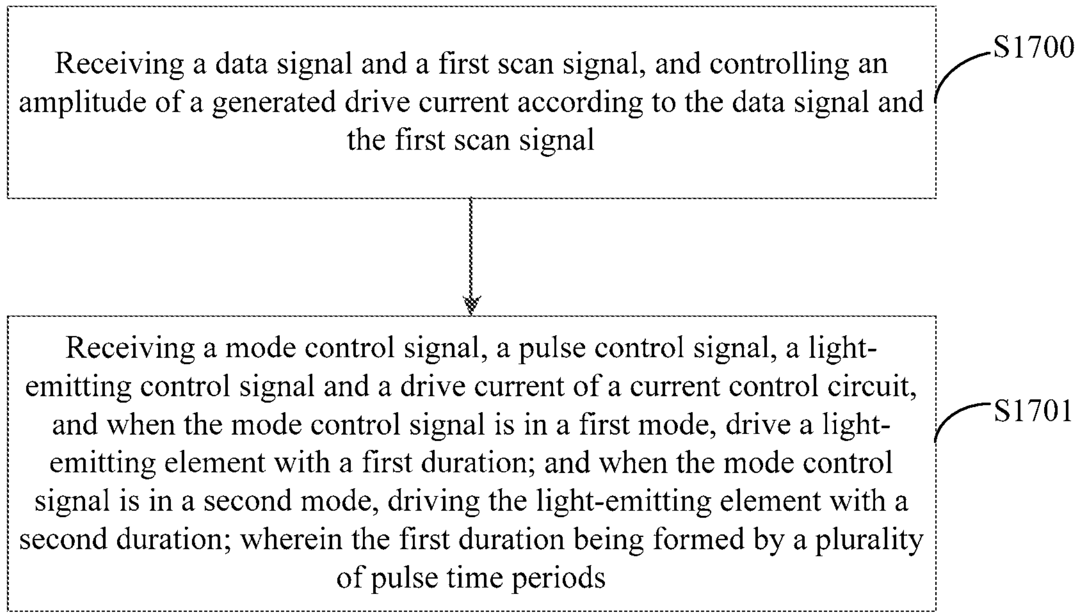
FIG. 17 is a schematic flow chart of a driving method of a pixel circuit provided by an embodiment of the present application.

Based on the same inventive concept, the embodiments of the present application further provide a driving method of a pixel circuit, used for driving the pixel circuit as mentioned above, the pixel circuit has a plurality of scanning cycles, and within one scanning cycle, as shown in FIG. 17, the driving method includes step S1700 to step S1701.

S1700, a current control circuit receives a data signal and a first scan signal, and controls an amplitude of a generated drive current according to the data signal and the first scan signal.

S1701, a duration control circuit receives a mode control signal, a pulse control signal, a light-emitting control signal and the drive current of the current control circuit, and controls a length of time for providing a light-emitting element with the drive current according to an amplitude of the mode control signal.

According to the pixel circuit, the driving method therefor, and the display device provided by the embodiments of the present application, by setting the amplitude of the data signal DI provided by the data signal end DI, the light-emitting element can work in a current path with a large amplitude, which ensures that the light-emitting element has high uniformity of the emission brightness, high light-emitting efficiency and stable chromaticity coordinates. In the case of achieving the high gray scale brightness, the length of time for providing the light-emitting element with the drive current is the second duration; and in the case of achieving the low gray scale brightness, the length of time for providing the light-emitting element with the drive current is the first duration. In this way, the drive current with high amplitude can be matched with short light-emitting time to achieve the display of the low gray scale brightness, so that the display effect of the display device at the low gray scale can be improved.

There are several points needing to be clarified below.

The drawings of the embodiments of the present application only relate to the structures involved in the embodiments of the present application, and other structures may refer to the usual design.

Without conflict, the embodiments of the present application, namely features in the embodiments may be combined with each other to obtain new embodiments.

Although the implementations disclosed in the present application are as described above, the content described is only implementations adopted for the convenience of understanding the present application, and is not intended to limit the present application. Any skilled in the art to which the present application belongs may make any modifications and changes in the form and details of implementation without departing from the spirit and scope disclosed in the present application. However, the scope of patent protection of the present application shall still be subject to the scope defined in the attached claims.

What is claimed is:

1. A pixel circuit, comprising:

a current control circuit;

a duration control circuit; and a light-emitting element; wherein the current control circuit is configured for receiving a data signal and a first scan signal, and controlling an amplitude of a generated drive current according to the data signal and the first scan signal; and the duration control circuit is configured for receiving a mode control signal, a pulse control signal, a light-emitting control signal and the drive current of the current control circuit, and is configured to control a length of time for providing the light-emitting element with the drive current according to an amplitude of the mode control signal;

wherein the duration control circuit comprises: a duration selection sub-circuit, a first duration control sub-circuit, a second duration control sub-circuit, and a light-emitting control circuit; wherein the duration selection sub-circuit is connected with a first voltage end, a mode control signal end, a second scan signal end, a third scan signal end, a first node and a second node, and is configured for writing the mode control signal into the first node and the second node under control of the mode control signal, a second scan signal outputted by the second scan signal end and a third scan signal outputted by the third scan signal end;

the first duration control sub-circuit is connected with the first node, a third node and a pulse control signal end, and is configured for writing a pulse control signal of the pulse control signal end into the third node under control of a signal of the first node;

the second duration control sub-circuit is connected with the second node, the third node and a light-emitting control signal end, and is configured for writing a light-emitting control signal of the light-emitting control signal end into the third node under control of a signal of the second node; and the light-emitting control circuit is connected with the third node, the first voltage end, and the current control circuit, and is configured for receiving the drive current, and controlling a duration of the drive current flowing through the light-emitting element under control of a signal of the third node, the light-emitting control signal outputted by the light-emitting control signal end, and the first scan signal outputted by a first scan signal end.

2. The pixel circuit according to claim 1, wherein, the duration selection sub-circuit comprises a first duration selection sub-circuit and a second duration selection sub-circuit, wherein the first duration selection sub-circuit is connected with the first voltage end, the mode control signal end, the second scan signal end, and the first node, and is configured for writing the mode control signal into the first node under the control of the mode control signal and the second scan signal; and the second duration selection sub-circuit is connected with the first voltage end, the mode control signal end, the third scan signal end, and the second node, and is configured for writing the mode control signal into the second node under the control of the mode control signal and the third scan signal.

3. The pixel circuit according to claim 2, wherein, the first duration selection sub-circuit comprises a first capacitor and a third transistor, wherein a control electrode of the third transistor is connected with the second scan signal end, a first electrode of the third transistor is connected with the mode control signal end, and a second electrode of the third transistor is connected with the first node; and a first end of the first capacitor is connected with the first voltage end, and a second end of the first capacitor is connected with the first node.

4. The pixel circuit according to claim 3, wherein, the second duration selection sub-circuit comprises a second capacitor and a fourth transistor, wherein a control electrode of the fourth transistor is connected with the third scan signal end, a first electrode of the fourth transistor is connected with the mode control signal end, and a second electrode of the fourth transistor is connected with the second node; and a first end of the second capacitor is connected with the first voltage end, and a second end of the second capacitor is connected with the second node.

5. The pixel circuit according to claim 2, wherein, the second duration selection sub-circuit comprises a second capacitor and a fourth transistor, wherein a control electrode of the fourth transistor is connected with the third scan signal end, a first electrode of the fourth transistor is connected with the mode control signal end, and a second electrode of the fourth transistor is connected with the second node; and a first end of the second capacitor is connected with the first voltage end, and a second end of the second capacitor is connected with the second node.

6. The pixel circuit according to claim 1, wherein, the light-emitting control circuit is connected with the current control circuit, the third node and the first voltage end, and is configured for receiving the drive current, and controlling, under the control of the signal of the third node, the duration of the drive current flowing through the light-emitting element.

7. The pixel circuit according to claim 6, wherein, the light-emitting control circuit comprises a fifth transistor, wherein a control electrode of the fifth transistor is connected with the third node, a first electrode of the fifth transistor is connected with the current control circuit, and a second electrode of the fifth transistor is connected with the first voltage end.

8. The pixel circuit according to claim 1, wherein, the first duration control sub-circuit comprises a first transistor, wherein a control electrode of the first transistor is connected with the first node, a first electrode of the first transistor is connected with the pulse control signal end, and a second electrode of the first transistor is connected with the third node.

9. The pixel circuit according to claim 8, wherein, the second duration control sub-circuit comprises a second transistor, wherein a control electrode of the second transistor is connected with the second node, a first electrode of the second transistor is connected with the light-emitting control signal end, and a second electrode of the second transistor is connected with the third node.

10. The pixel circuit according to claim 1, wherein, the second duration control sub-circuit comprises a second transistor, wherein a control electrode of the second transistor is connected with the second node, a first electrode of the second transistor is connected with the light-emitting control signal end, and a second electrode of the second transistor is connected with the third node.

11. The pixel circuit according to claim 1, wherein, the current control circuit comprises: a data writing circuit, a storage circuit and a drive circuit;

the data writing circuit is configured for writing a data signal outputted by a data signal end into a fourth node under control of the first scan signal;

the storage circuit is configured for storing electric energy at the fourth node; and the drive circuit is configured for generating a drive current under control of a signal of the fourth node.

12. The pixel circuit according to claim 11, wherein, the data writing circuit comprises an eighth transistor, the storage circuit comprises a third capacitor, and the drive circuit comprises a drive transistor, wherein a control electrode of the eighth transistor is connected with a first scan signal end, a first electrode of the eighth transistor is connected with the data signal end, and a second electrode of the eighth transistor is connected with the fourth node;

a first end of the third capacitor is connected with the fourth node, and a second end of the third capacitor is connected with a fifth node; and a control electrode of the drive transistor is connected with the fourth node, a first electrode of the drive transistor is connected with the light-emitting element, and a second electrode of the drive transistor is connected with the fifth node.

13. The pixel circuit according to claim 1, further comprising an external compensation circuit, wherein the external compensation circuit is configured for compensating a threshold voltage.

14. The pixel circuit according to claim 13, wherein the external compensation circuit comprises:

a sixth transistor;

a seventh transistor; and a ninth transistor; wherein a control electrode of the sixth transistor is connected with a light-emitting control signal end, a first electrode of the sixth transistor is connected with the current control circuit, and a second electrode of the sixth transistor is connected with a first electrode of the seventh transistor;

a control electrode of the seventh transistor is connected with a first scan signal end, and a second electrode of the seventh transistor is connected with a first voltage end; and a control electrode of the ninth transistor is connected with a fourth scan signal end, a first electrode of the ninth transistor is connected with a fifth node, and a second electrode of the ninth transistor is connected with a voltage output end.

15. A display device, comprising the pixel circuit according to claim 1.

16. A driving method of a pixel circuit, for driving the pixel circuit, wherein the pixel circuit comprises a current control circuit, a duration control circuit, and a light-emitting element; and wherein the pixel circuit has a plurality of scanning cycles, and within one scanning cycle, the driving method comprises:

receiving, by the current control circuit, a data signal and a first scan signal, and controlling, by the current control circuit, an amplitude of a generated drive current according to the data signal and the first scan signal; and receiving, by the duration control circuit, a mode control signal, a pulse control signal, a light-emitting control signal and the drive current of the current control circuit, and controlling, by the duration control circuit, a length of time for providing the light-emitting element with the drive current according to an amplitude of the mode control signal;

wherein the duration control circuit comprises: a duration selection sub-circuit, a first duration control sub-circuit, a second duration control sub-circuit, and a light-emitting control circuit; wherein the duration selection sub-circuit is connected with a first voltage end, a mode control signal end, a second scan signal end, a third scan signal end, a first node and a second node, and is configured for writing the mode control signal into the first node and the second node under control of the mode control signal, a second scan signal outputted by the second scan signal end and a third scan signal outputted by the third scan signal end;

the first duration control sub-circuit is connected with the first node, a third node and a pulse control signal end, and is configured for writing a pulse control signal of the pulse control signal end into the third node under control of a signal of the first node;

the second duration control sub-circuit is connected with the second node, the third node and a light-emitting control signal end, and is configured for writing a light-emitting control signal of the light-emitting control signal end into the third node under control of a signal of the second node; and the light-emitting control circuit is connected with the third node, the first voltage end, and the current control circuit, and is configured for receiving the drive current, and controlling a duration of the drive current flowing through the light-emitting element under control of a signal of the third node, the light-emitting control signal outputted by the light-emitting control signal end, and the first scan signal outputted by a first scan signal end.

* * * * *